July 23, 1929.  J. B. WEBB  1,721,759
CHAIN CONVEYER
Filed Oct. 17, 1928

INVENTOR.
Jervis B. Webb
BY Francis D. Hardesty
ATTORNEYS

Patented July 23, 1929.

1,721,759

UNITED STATES PATENT OFFICE.

JERVIS B. WEBB, OF DETROIT, MICHIGAN.

CHAIN CONVEYER.

Application filed October 17, 1928. Serial No. 312,952.

The present invention relates to chain conveyers and more especially to that type of conveyer in which the work is suspended by suitable carrying means from an overhead track and drawn along by a chain.

Among the objects of the invention is an improved trolley work carrier for supporting the load and forming means of attachment for the chain.

Another object is to simplify the construction of such trolley members and their attachment to the chain.

Other objects will readily occur to those skilled in the art upon reference to the following description and the accompanying drawings in which Fig. 1 is a vertical section on line 1—1 of Fig. 2 with parts in elevation.

Figure 3:
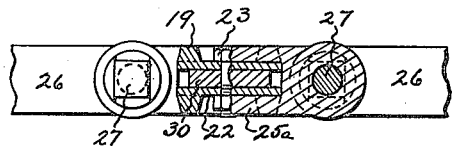
Fig. 3 is a section on Line 3—3 of Fig. 2.
Figure 1:
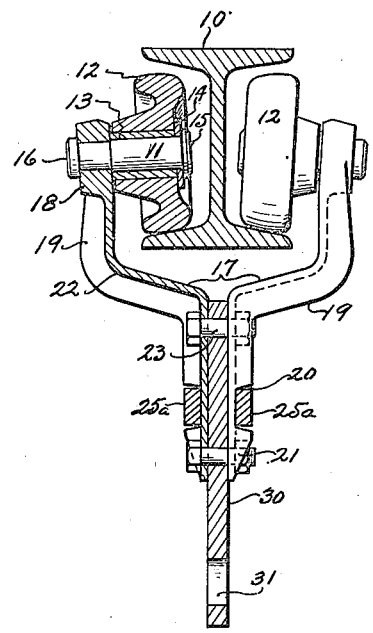
Figure 2:
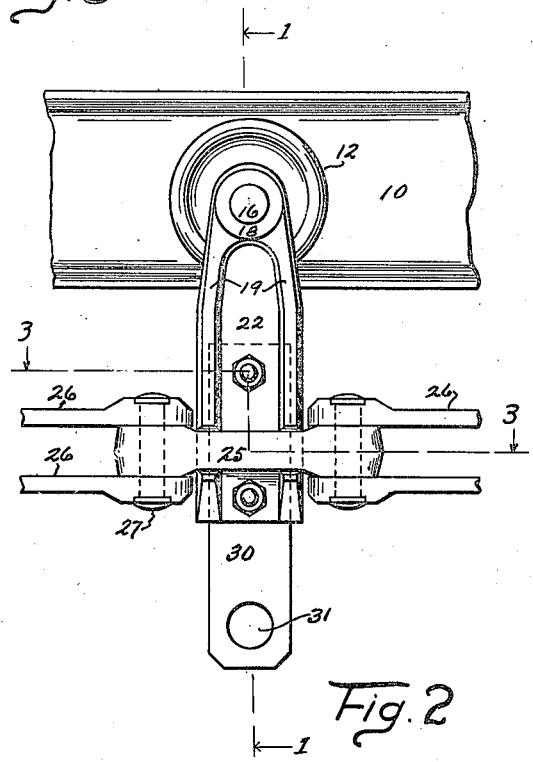
Fig. 2 is a side elevation thereof.
Figure 4:
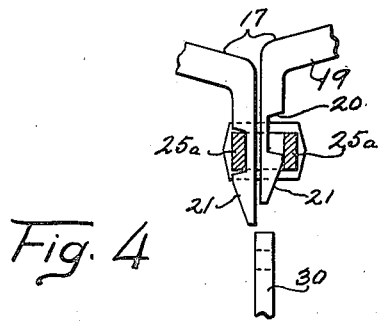
Fig. 4 is a detail of construction.

In the drawings a conventional I-beam track is shown at 10, being supported in any suitable fashion, with a double wheel trolley adapted to travel upon the two parts of the lower double flange and be supported and guided thereby. This double trolley consists of a yoke, each arm of which has fixed therein a pin 11, forming the spindle or axle for a wheel 12 adapted to roll on the flange of the track 10. A suitable bushing 13 may be fixed in the wheel 12 and means such as the washer 14 under the head 15 of pin 11 provided to hold the wheel on the pin, the preferred method of fixing the pin 11 in place being to rivet over the head 16 after assembling wheel, bushing, washer and yoke arm.

The two yoke arms 17 are preferably identical and each consists of the reverse bent member preferably forged with the pin boss 18 at its one end and with ribs 19 extending from the pin boss 18 to the lower end, being notched near the lower end as at 20 and tapered off below the notches as at 21. Between the ribs 19 are two or more holes in the web 22 for the passage of bolts 23.

The chain for use with the present trolley consists preferably of alternate links made of single members 25 having an eye in each end and connecting links of two side members 26 each having an eye in each end and pins 27 connecting said links. The members 25 are open in their mid portions and through these openings pass the lower ends of yoke members 17 with the sides 25ª of members 25 resting in notches 20.

When the yoke members 17 and links 25 have been thus assembled, a spacer 30 is thrust between the parallel webs of the yoke members and the latter and the spacer secured together by bolts 23.

When the trolley is to carry the load directly, the spacer 30 will extend below the chain and be provided with means by which such load may be attached, the means in the present case being indicated by the hole 31.

Now having described the invention and the preferred form of embodiment thereof, it is to be understood that the said invention is to be limited, not to the specific details herein set forth but only by the scope of the claims which follow:

What I claim is:—

1. In combination with a track of I-beam and a chain having a vertical opening through one of its links, a trolley comprising a yoke, the stem of which is adapted to extend through and be fixed in said opening, and track wheels carried by said yoke and adapted to roll on said track.

2. In combination with a track of I-beam, and a chain having a vertical opening through one of its links, a trolley comprising a yoke consisting of two mated members of similar construction, the stems of which are adapted to extend through and be fixed in said opening, and track wheels carried by said yoke and adapted to roll on said track.

3. In combination with a track of I-beam, and a chain having a vertical opening through one of its links, a trolley comprising a yoke consisting of two mated members of similar construction, the stems of which are adapted to extend through and be fixed in said opening, and track wheels carried by said yoke and adapted to roll on said track, each of said stems provided with a notch adapted to embrace one side of said chain link and means being provided to maintain said notch and said side in engagement.

4. In combination with a track of I-beam, and a chain having a vertical opening through one of its links, a trolley comprising a yoke consisting of two mated members of similar construction, the stems of which are adapted to extend through and be fixed in said opening, and track wheels carried by said yoke and adapted to roll on said track, each of said stems being provided on its outer face with a notch for embracing a side of said link, means being provided to separate said stems whereby said notches and sides are maintained in engagement.

5. A trolley for supporting a conveyer chain and a load to be conveyed thereby, said trolley comprising a yoke composed of two similar members, each having a trolley wheel at its upper end and being bent to cause its lower end to lie adjacent the lower end of the other member, stiffening ribs on said yoke members, said stiffening ribs being cut away near the lower ends whereby to form notches therein, a chain link embracing the said lower ends and lying in said notches, and a separator between said lower ends and secured thereto whereby to maintain engagement of said link and notches, and means on said separator for attachment of a load thereto.

JERVIS B. WEBB.